United States Patent [19]

Fukui et al.

[11] 4,442,459

[45] Apr. 10, 1984

[54] FACSIMILE TRANSCEIVER

[75] Inventors: Masahisa Fukui; Yoshio Ito, both of Yokohama, Japan

[73] Assignee: Canon Kabushiki Kaisha, Tokyo, Japan

[21] Appl. No.: 300,583

[22] Filed: Sep. 9, 1981

Related U.S. Application Data

[63] Continuation of Ser. No. 121,655, Feb. 15, 1980, abandoned.

[30] Foreign Application Priority Data

Mar. 3, 1979 [JP] Japan .................................. 54-24939
Mar. 29, 1979 [JP] Japan .................................. 54-37383

[51] Int. Cl.³ ............................................. H04W 1/04
[52] U.S. Cl. .................................... 358/286; 358/293
[58] Field of Search ............... 358/256, 285, 286, 289, 358/293

[56] References Cited

U.S. PATENT DOCUMENTS

| | | | |
|---|---|---|---|
| 2,776,336 | 1/1957 | Clauer | 358/256 |
| 3,527,883 | 9/1970 | Sobchak | 358/286 |
| 4,005,257 | 1/1977 | Krallinger et al. | 358/256 |
| 4,112,469 | 9/1978 | Paranjpe et al. | 358/296 |
| 4,122,462 | 10/1978 | Hirayama et al. | 354/5 |

Primary Examiner—Joseph A. Orsino, Jr.
Attorney, Agent, or Firm—Fitzpatrick, Cella, Harper & Scinto

[57] ABSTRACT

The present invention relates to an improvement in an emitting-receiving facsimile apparatus designed with arrangement and structure allowing to realize a smaller apparatus than in the prior art. The apparatus of the present invention includes an emitting unit having a table for supporting and advancing the original in a horizontal direction and an original reading device positioned under the table, and a receiving unit positioned adjacent to the emitting unit and having a roll-formed recording material of which rotary axis coincides with the advancing direction of the original, an advancing device for advancing the recording material in a direction perpendicular to the advancing direction of the original, a recording device for recording information on the recording material, whereby the above-mentioned structure allowing to compactize the apparatus then in the prior art.

4 Claims, 9 Drawing Figures

FACSIMILE TRANSCEIVER

This is a continuation of application Ser. No. 121,655, filed Feb. 15, 1980, now abandoned.

BACKGROUND OF THE INVENTION

1. Field of the Invention

The present invention relates to an emitting-receiving facsimile apparatus, and more particularly to a structure allowing size reduction of a facsimile apparatus having integrally combined emitting unit and receiving unit.

2. Description of the Prior Art

The conventional facsimile apparatus can be divided into a separate type composed of an emitting unit for converting the information to be transmitted into electrical signals and a separate receiving unit for receiving said signals to reconstruct the information, and a combined type in which said emitting unit and receiving unit are integrally combined. In recent years the apparatus of the latter combined type has become popular because of the increasing facsimile transmission and also because the combined type allows size and cost reduction by possible use of component parts in both units. The conventional facsimile apparatus is generally composed of an emitting mechanism A and a recording mechanism B which are positioned in parallel as shown in FIG. 1 in a common casing 1 in such a manner that the original advancing direction is parallel to the advancing direction of the recording sheet, or which are positioned front and back as shown in FIG. 2 in a common casing 1 in such a manner that the axes of the original and recording sheet substantially coincide with each other in the advancing direction thereof. In these figures there are also shown an original 2 to be transmitted, an inlet 3 and an outlet 4 for said original, a recording sheet 5 for recording the received image and an outlet 6 for said recording sheet, wherein the arrow a indicating the advancing direction of said original or recording sheet. It is to be further noted that the conventional apparatus shown in FIG. 1 can be made with a relatively small thickness (height) but requires a substantially larger area in the office because of the larger width of the apparatus. On the other hand the apparatus shown in FIG. 2, though smaller in width, requires a larger length, involving inconvenience in the operation and giving rise to an awkward appearance.

In order to resolve such drawback there was already proposed an overlaid structure of the emitting unit and the receiving unit as disclosed in the Japanese Patent Laid-Open No. Sho51-187818 corresponding to the U.S. patent application Ser. No. 574,709, in which the original is advanced linearly and the receiving unit is positioned under the ejection tray for the original. Such structure enables a linear original advancement and effective space utilization by the original reading device and the receiving unit, but still is insufficient in respect of modern design concepts.

SUMMARY OF THE INVENTION

The object of the present invention is to allow size reduction of the facsimile apparatus and to provide a facsimile apparatus of an improved performance. More specifically the object of the present invention is to provide a facsimile apparatus rendered smaller and improved in performance than any of the conventional apparatus. The apparatus of the present invention not only is reduced in width, length and height but also allows the original reading without excessively bending the original, so that a relatively thick unbendable original can also be transmitted. Another object of the present invention is to provide a facsimile apparatus in which the internal space is efficiently utilized.

According to the present invention, the abovementioned objects are achieved by a facsimile apparatus having integrally combined the emitting and receiving units wherein said emitting unit comprising a table for supporting thereon and advancing an original to be transmitted in the horizontal direction, original advancing means for advancing the original supported on said table in a linear horizontal direction and original reading means positioned under said table for reading said original, while said receiving unit is positioned adjacent to said emitting unit comprising a roll-formed recording material positioned with the axis thereof parallel to the advancing direction of said original means for recording image information on said recording material in response to the received signals and advancing means for advancing said recording material with the image recorded thereon in a direction perpendicular to the advancing direction of the original, wherein said emitting and receiving units are incorporated in an integral structure.

In the above-mentioned structure said original supporting table may also be utilized as an upper cover for said original reading means, and the upper wall member of the receiving unit may also be utilized as the ejection tray for the recording material. The original reading unit and the recording unit are mutually independent, so that the height of the entire apparatus can be minimized by suitably positioning, with respect to either higher unit, the other unit.

DESCRIPTION OF THE PREFERRED EMBODIMENTS

Now the present invention will be clarified in detail by description of the embodiments thereof.

Figure 3:
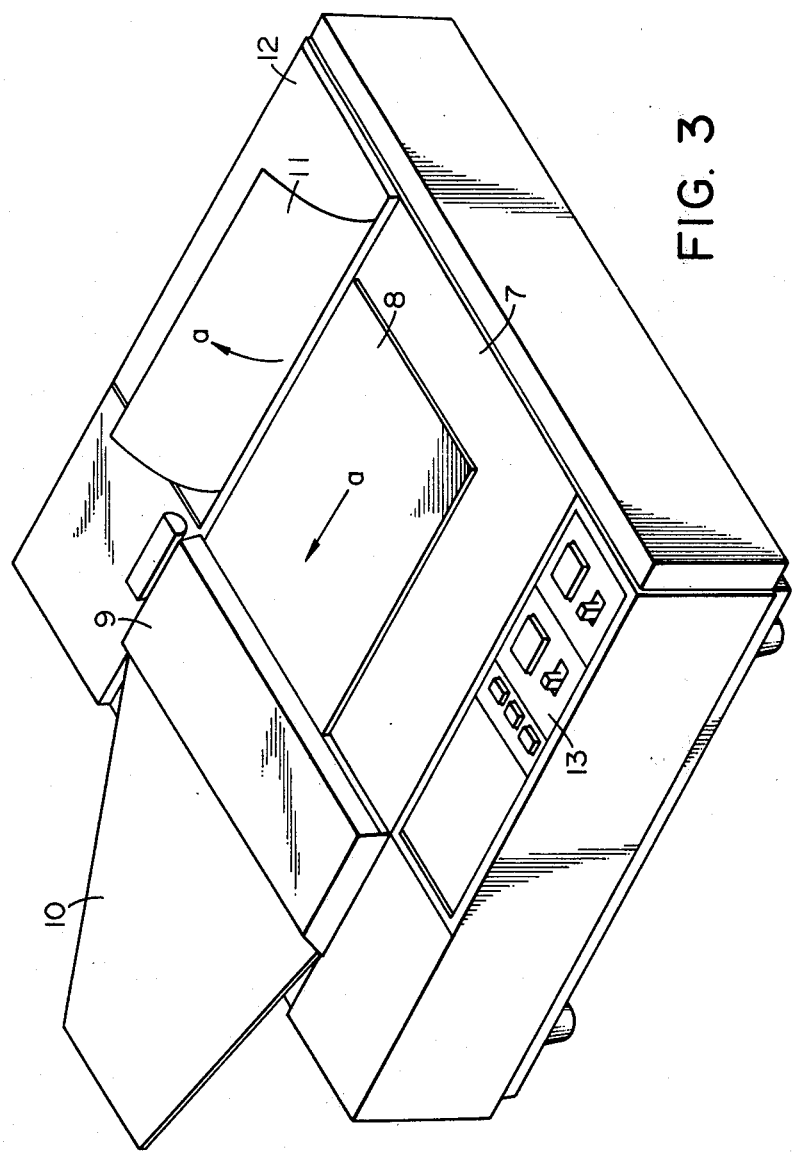
FIG. 3 is a perspective view of the apparatus embodying the present invention.

Referring to FIG. 3 showing, in a perspective view, a facsimile apparatus embodying the present invention, there are shown a table 7 for supporting and guiding an original 8 placed on said table 7 along a standard lateral edge thereof, and a cover 9 for transport roller at which position the information is read from said original 8.

After said information reading, the original is further advanced by said roller to a tray 10. The original reading means is positioned under said roller and table 7, so that said table 7 also functions as an upper cover for said reading means. A receiving unit is positioned at the right-hand side of the above-explained emitting unit in the illustration. 11 is a recording material on which an image is recorded by recording means, and 12 is a cover for the recording unit which supports said recording material 11 thereon. 13 shows a group of switches for controlling the functions of the facsimile apparatus.

Figure 4:
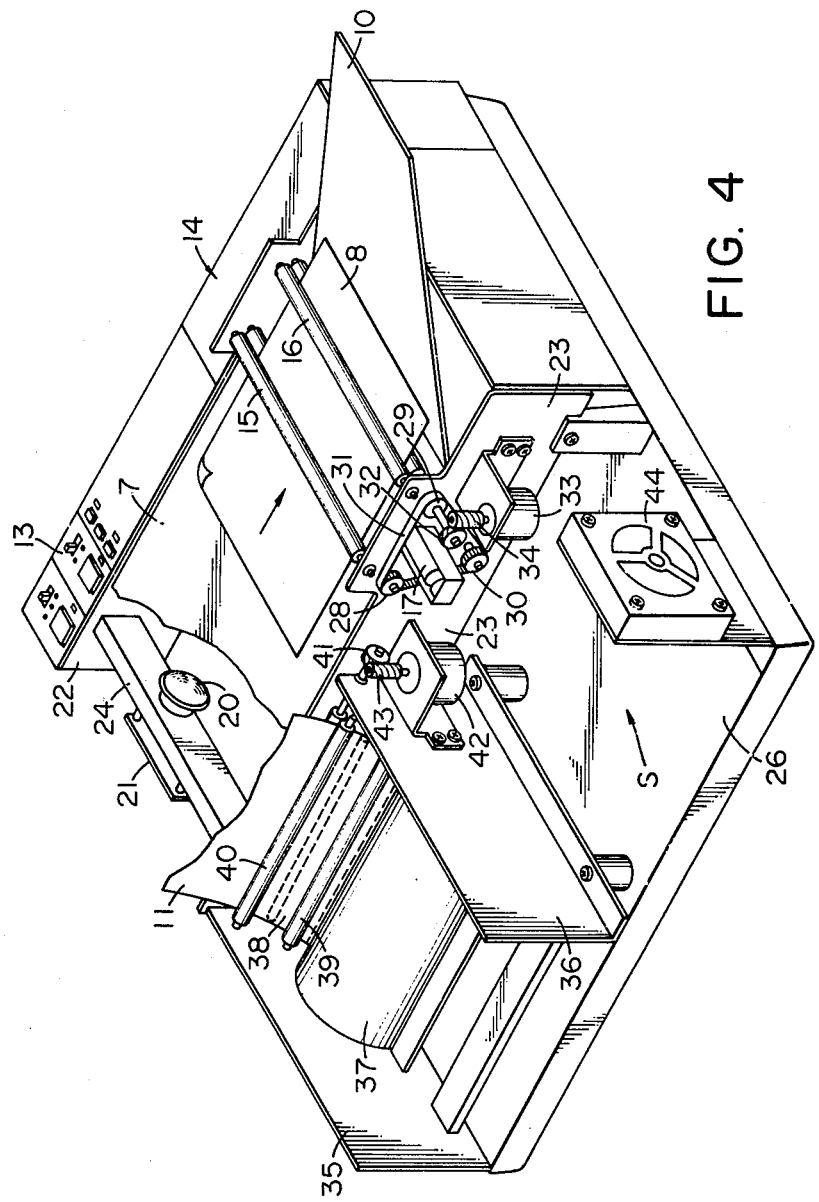
FIG. 4 is a perspective view showing the internal structure of the apparatus shown in FIG. 3.

Now reference is made to FIG. 4 showing the internal structure of the apparatus shown in FIG. 3. When the original 8 to be transmitted is slightly pushed into a roller unit 14 from the position shown in FIG. 3, unrepresented detecting means detects the presence of the original to initiate the rotation of feed rollers 15 and eject rollers 16 thereby advancing the original 8 at a constant speed in the direction of arrow. Said rollers 15, 16 are respectively composed of paired rollers and are provided therebetween with an original reading slit and an original illuminating unit to be explained later. The upper ones of said rollers 15, 16 are structured to be displaceable upwards against the biasing springs.

The above-explained roller arrangement allows a substantially linear advancement of the original 8, and also accepts bound or thick originals because of the variable distance between the paired rollers.

Figure 5:
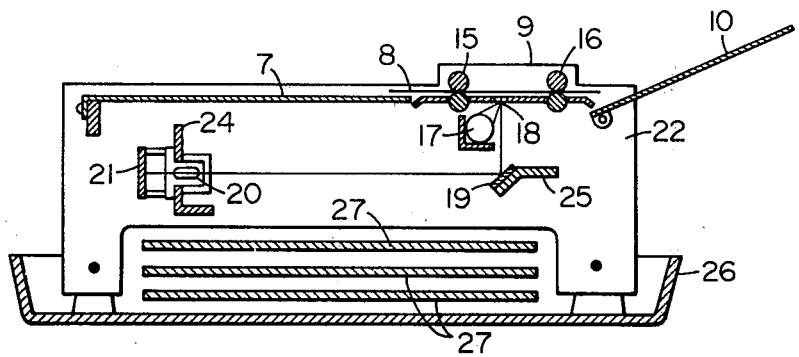
FIG. 5 is a cross-sectional view of the original reading unit of the apparatus shown in FIG. 4, along the original advancing direction.

FIG. 5 shows the original reading means of the emitting unit in a cross-sectional view, wherein an illuminating lamp 17 illuminates an information bearing face of the original 8 passing through a slit 18. The image of the original is transmitted from said slit to a photoelectric converting element 21, for example a charge coupled device, through a fixed mirror 19 and a focusing lens 20, whereby said image in converted into electric signals by said element 21. Said lens 20, element 21 and mirror 19 are mounted on stay members 24, 25 fixedly positioned between lateral plates 22, 23 defining the emitting unit. Also there is provided a common base plate 26 on which said emitting and receiving units are mounted. A control circuit board 27 is positioned between said original reading means and said base plate 26.

As a linear original advancement is rendered possible by the above-explained reading means guiding the original image to the converting element 21 by the slit exposure, the above-explained roller arrangement not only allows the use of an original as thick as 0.5 mm or an unbendable original, but also the use of an original for example up to 1.5 mm thick if the feed rollers 15 are designed with suitable feeding ability.

The drive mechanism for said rollers is accommodated in a space which is also used for the drive mechanism for the receiving unit as will be explained later, and drives the lower ones of said paired rollers 15, 16. The rollers 15, 16 are provided at the left-hand end thereof with timing pulleys 28, 29, 30 engaging with a timing belt 31, wherein said pulley 29 is provided with a coaxial pinion 32 engaging with a worm gear 34 which is rotated by a stepping motor 33 to drive said rollers 15, 16.

In the above-explained apparatus the lamp 17 is composed of a fluorescent lamp which is commonly utilized in the facsimile apparatus because of the high light intensity with the low heat generation and the relatively long service life thereof. In the use of a fluorescent lamp, the end portions thereof have to be positioned outside the iluminating area in order to obtain uniform illumination over the entire width since the light intensity of a fluorescent lamp is inevitably weaker in the end portions then in the central portion thereof. For this reason the fluorescent lamp generally becomes larger than the width of the original illuminating unit and often requires projecting portions on the apparatus, but such undesirable projecting portions are not necessary in the apparatus of the present invention since the end portions of the fluorescent lamp are accommodated in the spaces for the switches and for the drive mechanism.

Figure 6:
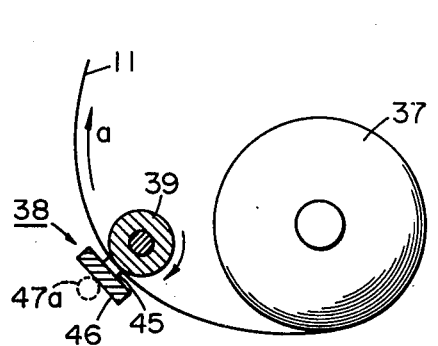
FIG. 6 is a partial cross-sectional view of the receiving unit showing the recording mechanism with a thermal head.

The receiving unit is positioned adjacent to said emitting unit and principally accommodated in a space defined by two parallel plate members 35, 36 positioned perpendicular to the advancing direction of the original. A roll-formed recording material 37, for example thermal paper, is wound on a tubular core rotatably supported on unrepresented support members and is subjected to information recording by a recording head 38 activated by the received signals. A pressure roller 39 is provided to maintain said recording material 37 in contact with the recording head 38. The relation between said recording material 37, recording head 38 and pressure roller 39 at the information recording is shown in FIG. 6.

The recording material 37 having recorded the information in the above-explained manner is ejected from the apparatus by paired rollers 40 as shown in FIGS. 3 and 4, said rollers being driven by a pinion 41 engaging with a worm gear 43 driven by a stepping motor 42. A fan 44 provided in the same space ejects the heat generated by the motors 33, 42, lamp 17, recording head 38 etc.

In the foregoing embodiment both emitting and receiving units can be realized with the height of the roll-formed recording material used in the receiving unit as the mutual relation of said units is determined by said recording material. In this manner it is rendered possible to obtain an entire height of the apparatus close to the height of said roll-formed recording material, in marked contrast to the aforementioned third conventional structure in which the receiving unit is positioned under the original advancing means.

Figure 1:
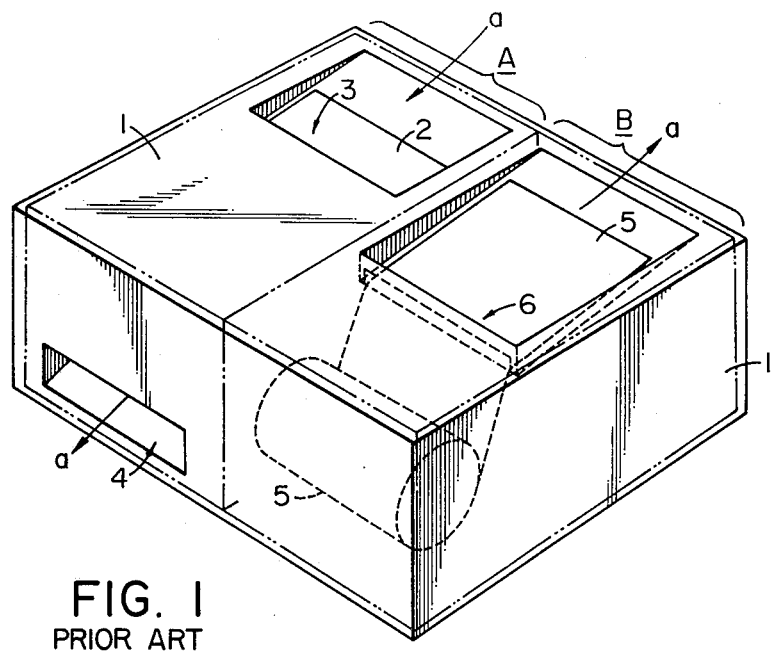
FIGS. 1 and 2 are perspective views of conventional apparatus.
Figure 2:
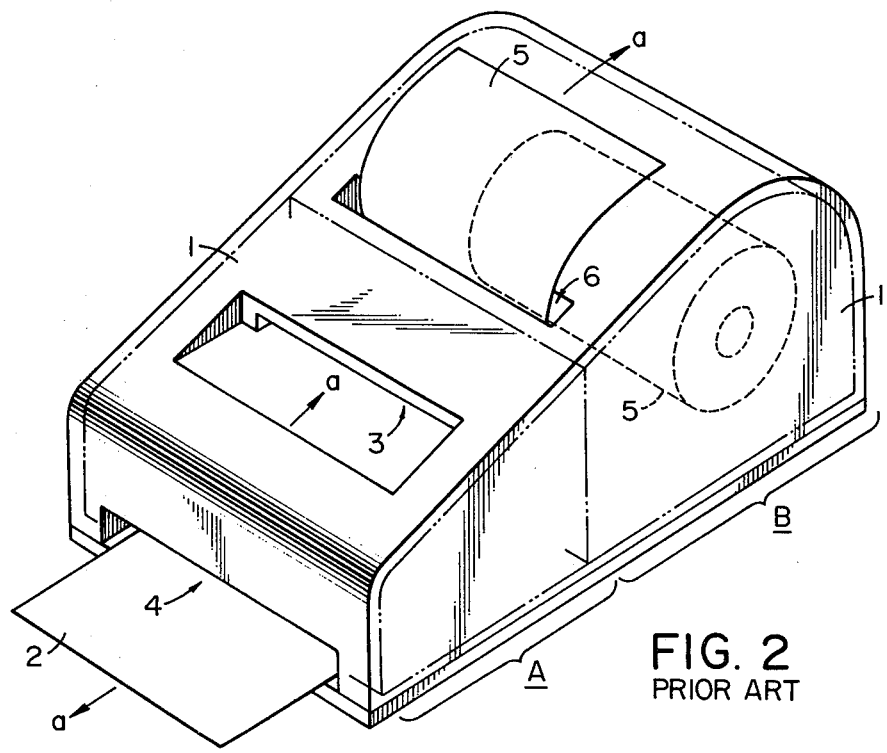

The present invention, employing linear original advancement enabling the use of a relatively thick or unbendable original and utilizing a roll-formed recording material with the rotary axis thereof positioned parallel to the original advancing direction but outside the original advancing path as explained in the foregoing, provides the following advantages. The apparatus of the present invention in front view, in comparison with the conventional apparatus shown in FIG. 1 wherein the original and the recording material are displaced in parallel and thus requiring a minimum width equal to the sum of the widths of said original and recording material, only requires a width corresponding to the sum of the width of the original and the diameter of the recording material, and the difference becoming more and more evident as the width of the recording material increases. The length of the apparatus can be further reduced by shortening the optical path length while the thickness of the apparatus can be matched to the diameter of the recording material as already explained in the foregoing, whereby it is rendered possible to obtain a compact thin multi-functional facsimile apparatus. Besides the structure of the present invention, in which the drive sources for the original and the recording material are accommodated in a combined space, allows efficient heat control and also effective space utilization.

As explained in the foregoing, the present invention provides a small facsimile apparatus not associated with the drawbacks unavoidable in the conventional apparatus. It will naturally be understood that the structure of the original reading means and the printing means for recording material are not limited to those shown in the foregoing embodiment. For example the printing means can also be composed of an ink jet printing system or an electric current recording system. Also the dimension of various parts are variable according to the width, thickness etc. of the original and recording material to be employed.

In case of a facsimile apparatus employing thermal recording system as explained in the foregoing embodiment, there is required heat-radiating means for dissipating the heat accumulated in the substrate of the recording head. The heat generated by the thermal elements 46 of a thermal recording head 38 (FIG. 6) is only partially consumed in the coloring reaction of the thermal recording paper and mostly transmitted by conduction to a substrate 46 supporting said thermal elements and accumulated therein. In case of prolonged continuous recording, high-speed recording or recording with an elevated percentage of image area (i.e. with an elevated percentage of solid black area) the heat accumulated in the substrate 46 is increased to a temperature higher than the coloring temperature of the thermal recording paper, thus deteriorating the image quality by so-called smudging or trailing.

For this reason the substrate 46 is provided with heat-radiating means, which is conventionally composed of a heat sink or a raditing fin made for example of aluminum eventually combined with a forced cooling fan. However, in order to satisfactorily dissipate the large amount of heat generated in the above-mentioned prolonged recording or high-speed recording, eventually amounting to several hundred watts, there has been required a heat sink or a radiating fin of a large size. Thermal recording heads are known in a thick-layer type and a thin-layer type, of which the former is less expensive but requires a double or triple recording energy, leading to a larger heat accumulation. For this reason the thermal recording head of the thick-layer type necessitates heat-radiating means of a particularly large dimension.

In the conventional thermal recording facsimile apparatus, such large heat-radiating means has been a significant obstacle in reducing the dimension and weight of the apparatus. Also in case of foced cooling with a fan it becomes necessary to pay sufficient attention to the air flow in the apparatus, which restricts the arrangement of component parts therein and reduces the freedom in designing for size reduction.

Figure 7:
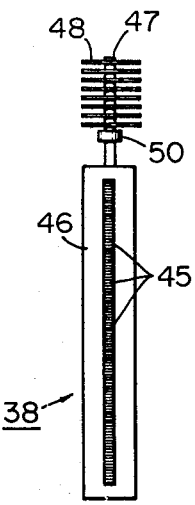
FIG. 7 is a plan view of the thermal head provided with a heat pipe.
Figure 8:
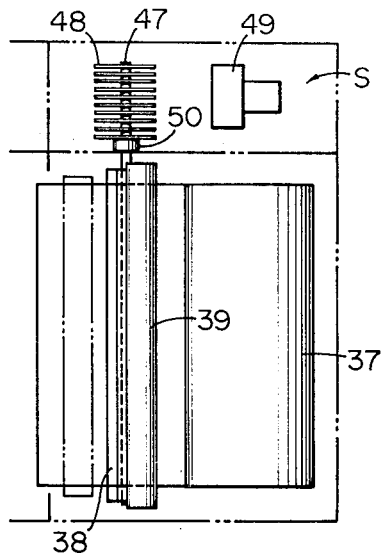
FIG. 8 is a plan view of the apparatus showing an effective arrangement of the head radiating portion of said heat pipe.
Figure 9:
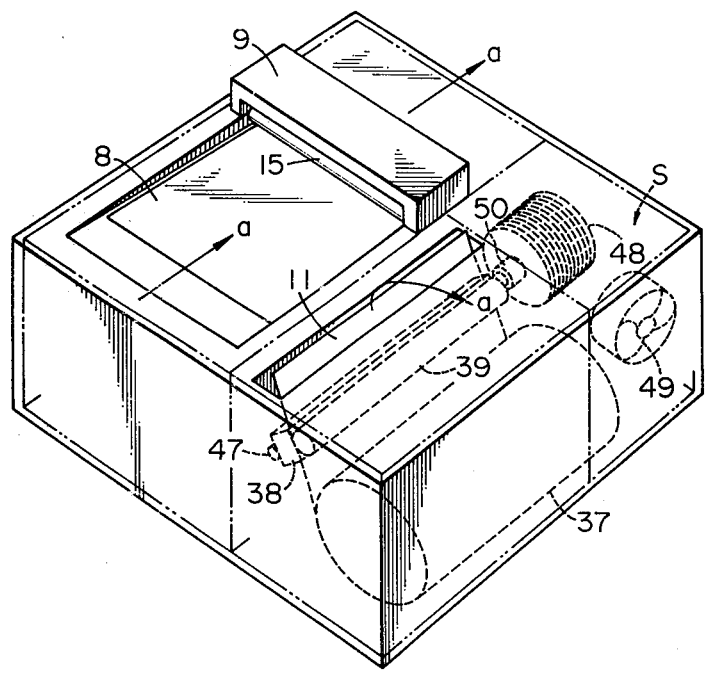
FIG. 9 is a perspective view of an example of the facsimile apparatus based on the structure of the present invention and provided with a thermal head having a heat pipe.

According to the present invention, however, it is rendered possible to resolve this problem. This solution is shown in a plan view of FIG. 8 illustrating a thermal recording head of FIG. 7 equipped with a heat ripe and mounted in a facsimile apparatus of the basic structure explained in the foregoing, and in a perspective view of FIG. 9.

More specifically the foregoing structure utilizes the excellent heat conduction property (more than 100 times of the heat conductivity of copper) of a known heat pipe as the heat-radiating means for the substrate 46, wherein said heat pipe 47 is provided parallel to and in contact with the array of thermal elements 45 over the substantially entire length of the substrate 46 and is extended to a lateral marginal space S (FIG. 4) obtained in such structure. Said extended end is provided with heat radiating fins 48 for cooling by natural convection or for forced cooling with a blower fan 49.

The present invention allows efficient and compact arrangement of the heat-radiating mechanisms as the aforementioned heat-radiating fins 48 mounted on an end of the heat pipe 47 and the cooling fan 49 are accommodated in an otherwise dead marginal space S created by the foregoing arrangement of the emitting and receiving units.

The use of the aforementioned thermal recording head combined with the heat pipe as the heat-radiating means therefor gives rise to the following effects and advantages.

In the above-explained structure of the heat radiating means, the heat accumulated in the substrate 46 is absorbed rapidly and substantially uniformly over the entire length thereof by the splendid heat conduction of the heat pipe 47 and is efficiently dissipated by natural convection or forced convection with the fan 49 from the heat radiating fins 48. In such arrangement the substrate 46 is peferably provided with a temperature sensor such as a thermister for conducting heat dissipation with the fan 49 when the temperature of the substrate 46 is lower than the color developing temperature of the recording paper and for conducting forced convection cooling with the fan 49 when said temperature of the substrate 46 approaches said color developing temperature for example in a prolonged continuous recording operation. In such manner it is rendered possible to maintain the substrate at an approximately constant temperature level during the entire recording operation, thereby preventing unevenness in the image density resulting from the fluctuation in the substrate temperature.

As explained in the foregoing, the heat pipe 47, because of the excellent heat conduction property thereof, efficiently absorbs the heat from the longitudinal portion thereof and transmits thus collected heat to the extended end thereof, thus enabling efficient heat dissipation by heat-radiating fins 48 mounted on said extended end. In addition the heat pipe 47 itself is small and of a light weight. Consequently in comparison with the conventional heat dissipation with a heat sink or with heat radiating fins, it is rendered possible to reduce the size of the heat radiating mechanism itself and to reduce the weight thereof by one half or even less. Furthermore a sufficient heat dissipation can be obtained even in case of a thick-layer type thermal recording head.

The heat pipe 47 can be maintained in pressure contact with an external face of the substrate 46 as shown by chain lines 47a in FIG. 6, but an improved heat conduction can be obtained by partially or completely embedding the heat pipe 47 in the substrate 46 if it is sufficiently thick, or in a highly heat-conductive member made for example of aluminum and mounted on the substrate 46. Furthermore, in order to improve the heat conduction between the substrate 46 and heat pipe 47, substrate 46 and heat-conductive member, said member and heat pipe 47 or heat pipe 47 and heat radiating fins 48 there is preferably employed an electroconductive grease, for example, in the space between said components.

Furthermore it is possible to employ plural heat pipes. Also the use of a variable conductance heat pipe allows control of the substrate temperature within a desired range even without the temperature sensor or the fan in case of a thermal recording head of a relatively low power.

Also said fins 48 may be replaced by other mechanisms, for example a water-cooled radiator. On the other hand, at the start of recording operation, the head substrate 46 is in a cooled state, particularly in a cold region or in a cold place. For this reason the image density remains low for a while after the start of recording operation, as the color density becomes higher at a higher temperature of the substrate 46 for a given power supplied to the recording elements 45.

In order to prevent such phenomenon said extended end of the heat pipe 47 can be provided with a heat source for example a heater 50 for preheating said heat pipe, said heat source being activated upon turning on for example of the main switch of the apparatus. In this manner the heat pipe 47 is rapidly heated over the entire length thereof, thus rapidly preheating the entire substrate 46, and enabling an appropriate image density to be obtained from the start of the recording operation. Said heat source 50 is turned off by a temperature sensor when the temperature of the substrate 46 reaches a predetermined adequate temperature.

Conventionally the preheating of the substrate 46 is achieved by a heater positioned under said substrate, wherein said heater is of a large area in order to obtain uniform preheating. On the other hand, according to the present invention, the heat pipe 47 provided for heat dissipation can also be utilized for preheating by a heat source 50 provided at a portion of said pipe 47, whereby rapid and uniform preheating can be achieved within a limited space and with reduced cost by means of the property of said heat pipe 47.

What we claim is:

1. A facsimile transceiver comprising:

an emitting unit having a carrying surface at its upper portion and which defines a rectilinear path along which an original to be transmitted is guided, original advancing means for advancing the original carried on said carrying surface, and means disposed under said carrying surface for reading the original during its rectilinear advancement; and a receiving unit combined into an integral structure with said emitting unit, said receiving unit being juxtaposed side-by-side with said emitting unit so that said units do not overlap with each other when viewed from above, and said receiving unit including means for supporting roll-formed recording material such that the rotating axis of the roll is parallel to the advancing direction of the original, means for recording image information on the recording material in accordance with received signals, advancing means for advancing the recording material with the information recorded thereon in a direction which is perpendicular to the advancing direction of the original, and means defining a discharge port in a top cover of said receiving unit through which the recording material advanced by said advancing means is discharged, the discharge port extending in a direction parallel and to one side of the advancing path of the original;

wherein the advancing path along which the original advances after being scanned does not overlap with the receiving unit, when viewed from above.

2. A facsimile transceiver according to claim 1, wherein said original carrying surface functions also as a cover surface for said original reading means.

3. A facsimile transceiver according to claim 1, wherein the top cover of said receiving unit constitutes a part of said integral structure functioning as an ejection tray for the recording material, when the recording material is discharged through the discharge port and is advanced in a direction away from the carrying surface.

4. A facsimile transceiver according to claim 1, wherein the height of said receiving unit is determined substantially in relation to the maximum diameter of the rolled recording material, while the height of the emitting unit connected to said receiving unit is determined in relation to the height of said receiving unit.

* * * * *

UNITED STATES PATENT AND TRADEMARK OFFICE
CERTIFICATE OF CORRECTION

PATENT NO. : 4,442,459

DATED : April 10, 1984

INVENTOR(S) : MASAHISA FUKUI, ET AL.

It is certified that error appears in the above-identified patent and that said Letters Patent is hereby corrected as shown below:

Column 2, line 9, "units wherein" should read --units,--.

Column 4, line 4, "larger" should read --longer--.

Column 5, line 51, "foced" should read --forced--;
          line 59, "ripe" should read --pipe--.

Column 6, line 24, "peferably" should read --preferably--.

Signed and Sealed this

Sixteenth Day of October 1984

[SEAL]

Attest:

GERALD J. MOSSINGHOFF

Attesting Officer

Commissioner of Patents and Trademarks